United States Patent
Klier et al.

(10) Patent No.: US 11,804,980 B2
(45) Date of Patent: Oct. 31, 2023

(54) EXTENSION MODULE FOR FUNCTION EXTENSION OF A NETWORK ASSEMBLY

(71) Applicant: LEDVANCE GmbH, Garching bei Munich (DE)

(72) Inventors: Philipp Klier, Munich (DE); Alexander Niggebaum, Munich (DE); David Chilachava, Munich (DE)

(73) Assignee: LEDVANCE GMBH, Garching bei Munich (DE)

( * ) Notice: Subject to any disclaimer, the term of this patent is extended or adjusted under 35 U.S.C. 154(b) by 96 days.

(21) Appl. No.: 17/462,203

(22) Filed: Aug. 31, 2021

(65) Prior Publication Data
US 2022/0078042 A1    Mar. 10, 2022

(30) Foreign Application Priority Data

Sep. 7, 2020  (DE) .......................... 102020123334.5

(51) Int. Cl.
*G06F 1/3209*     (2019.01)
*H04L 12/40*      (2006.01)

(52) U.S. Cl.
CPC ...... *H04L 12/40039* (2013.01); *G06F 1/3209* (2013.01)

(58) Field of Classification Search
CPC .......................... H04L 12/40039; G06F 1/3209
See application file for complete search history.

(56) References Cited

U.S. PATENT DOCUMENTS

| | | | | |
|---|---|---|---|---|
| 9,974,147 B1* | 5/2018 | Davis | ................... | H05B 47/115 |
| 10,356,873 B1* | 7/2019 | Mays, II | ................ | H05B 47/19 |
| 10,524,334 B1* | 12/2019 | Price | ...................... | H05B 45/10 |
| 10,588,205 B1* | 3/2020 | Mays, II | ................ | H05B 45/37 |
| 2003/0061428 A1* | 3/2003 | Garney | ................ | G06F 9/5027 |
| | | | | 710/300 |
| 2018/0352637 A1* | 12/2018 | Tikkanen | ............... | H05B 45/12 |
| 2019/0173748 A1* | 6/2019 | Gorka | ................ | G05B 19/0426 |
| 2020/0183867 A1* | 6/2020 | Ender | ................. | H04L 12/2816 |
| 2022/0187347 A1* | 6/2022 | Sargsyan | ............. | G01R 15/142 |

FOREIGN PATENT DOCUMENTS

EP          3916497 A1 * 12/2021 ............. G05B 15/02

* cited by examiner

*Primary Examiner* — Aurel Prifti
(74) *Attorney, Agent, or Firm* — Hayes Soloway PC (57) ABSTRACT

An extension module for function extension of a network assembly is provided, wherein the network assembly has a communication bus for providing communication between a logic unit of a base module of the network assembly and one or more extension modules, in particular one or more function devices and/or communication modules, and wherein the extension module is designed to be connected to the communication bus of the network assembly for function extension or function provision of the network assembly in order to provide at least one additional function of an electrical load connected to the network assembly.

20 Claims, 11 Drawing Sheets

EXTENSION MODULE FOR FUNCTION EXTENSION OF A NETWORK ASSEMBLY

CROSS-REFERENCE TO RELATED APPLICATION AND PRIORITY

This patent application claims priority from German Patent Application No. 102020123334.5, filed on Sep. 7, 2020, which is herein incorporated by reference in its entirety.

TECHNICAL FIELD

The present disclosure relates generally to network assemblies. More specifically, the present disclosure relates to extension modules for functionally expanding a network assembly.

BACKGROUND

Electronic devices, in particular lighting devices or operating devices for luminaires, are becoming increasingly complex and have an increasing number of functionalities, which are usually realised by corresponding functional units, such as sensor systems, communication interfaces, remote control units, intelligent electronics or similar. Furthermore, network-capable electronic devices or network devices are known that can participate in device networks or IoT (Internet of Things), such as luminaires or lighting devices, in a light management system or LMS (Light Management System). In particular, the connection of a luminaire to an IoT network or LMS can be realised by means of additional, network-specific hardware and software units, which can basically be different for each network. Furthermore, electronic devices or luminaires are constantly being converted or upgraded to meet the requirements for functionality, controllability, and network capability. The already existing devices or additional units cannot easily be used for other networks or other purposes, which can lead to high costs and high environmental impact.

SUMMARY

One object of the embodiments of the present disclosure is to provide a simple and cost-effective possibility of extending the functionality of existing electronic devices or lighting devices.

To solve this object, according to a first aspect, an extension module for function extension of a network assembly with a communication bus or bus system for providing communication between a logic unit of a base module of the network assembly and one or more extension modules, in particular one or more functional devices and/or communication modules, is proposed.

The extension module is designed or configured to be connected to the communication bus of the network assembly for the purpose of function extension or function provision of the network assembly, in order to provide at least one additional function or additional functionality of an electrical consumer connected to the network assembly, in particular a lighting device. In particular, the additional functions may comprise control and/or network functions of the electrical load. In particular, the additional functions can make it possible to control the electrical consumer, in particular a luminaire, with a device management system or LMS and/or sensors. The extension module can be designed separately or as part of a functional device, for example a luminaire.

The extension module may comprise a power section for integrating the extension module into the power supply circuit or power grid circuit of the at least one load and a control section with a control unit for controlling the power section. In particular, the power section may be designed to be connected in series with the load in the power grid circuit so that the electrical power provided to the load can be easily controlled by the control of the power section.

The power section can in particular comprise a circuit breaker for switching the at least one load on and off, in particular by closing and opening the power supply circuit. The circuit breaker can thus be used to easily interrupt the power circuit of the at least one load if required.

The control section of the extension module may include a control interface for connecting the control section of the extension module to the communication bus or ILB (Intra Luminaire Bus). The control interface thus gives the control section of the extension module the network capability so that the extension module can be controlled by a network, in particular by an LMS.

In some embodiments, the extension module comprises a measuring device for detecting at least one current parameter, in particular electrical parameter, of the electrical load. In particular, the measuring device can be designed to detect performance and/or diagnostic data for the at least one electrical load. The current value of parameters as well as power and diagnostic data can be used, for example, for controlling and/or diagnosing luminaires in an LMS.

The measuring device can in particular have a Hall sensor and/or a shunt for detecting the at least one electrical parameter. The Hall sensors or shunts are readily available and are suitable for picking up current electrical parameters from a circuit.

The additional function can in particular comprise a control of the at least one load, in particular a luminaire. By connecting the extension module to the network assembly, the functionality of the electrical load can thus be subsequently extended by the control function. The control can be carried out in particular based on the detected value of the at least one parameter or the power and/or diagnostic data, so that the current operating state of the load is taken into account when controlling the at least one load or the light.

In some embodiments, the extension module is designed as a master module for controlling one or more slave modules. In particular, the extension module can act as a central switch for further switches or "slave" switches, so that an LMS with several switches, in particular for a plurality of luminaires, can be realised in a simple and cost-effective manner.

The base module may comprise a logic or logic unit configured to be connected to a communication bus, in particular to an internal communication bus of the network assembly, for providing communication between the logic unit and one or more extension modules or peripherals, in particular one or more functional devices and/or communication modules, for function extension or function provision of the network assembly.

In particular, the communication bus can be designed to transmit data or signals between the logic unit and the extension modules. In some embodiments, the communication bus is designed to supply one or more extension modules with electrical energy. In particular, the communication bus can comprise signal lines for serial communication or transmission of messages and/or supply lines for supplying power to the extension modules or peripherals. In some embodiments, the communication bus is formed as part of the base module. In particular, the communication bus can be designed to be connected to a plurality of functional devices and/or communication modules as extension modules in order to provide desired functionalities.

In particular, the logic unit represents the central module or node via which, in particular, all network communication can take place. The logic or the logic unit thus plays the central role in such a modular network assembly. The logic unit can forward, process and/or change information according to the intended operating scenarios. In particular, the logic unit can comprise a microcontroller with a processor for data processing, with a memory unit for storing data and machine-readable codes for the processor, and with an interface for connecting the logic unit to the communication bus. The logic unit or the microcontroller may further comprise one or more further interfaces, in particular for configuring digital inputs and outputs and/or for transmitting measurement signals. Configuring the logic unit to perform certain actions means in this context that corresponding machine-readable instructions for the processor are stored in the memory unit of the logic unit to perform these actions.

The logic unit can be configured in such a way that communication via the communication bus between the logic unit and the extension modules can take place, in particular exclusively, via a system-internal or proprietary communication protocol. The system-internal communication protocol can in particular make unauthorised access to the communication bus of the network assembly more difficult or prevent it. In particular, the use of the system-internal or proprietary communication protocol can make it difficult or impossible to connect unauthorised extension modules to the base module. Thus, the communication bus can serve as a protected, proprietary interface or ILB (Intra Luminaire Bus) for the exchange of data or messages between the logic unit and the extension modules or peripherals.

The functional devices or peripherals may in particular comprise sensor systems or various sensors, drivers, in particular LED drivers, push buttons and/or further devices. In the case of a luminaire, a functional device can be designed to detect or control the amount of light produced by the luminaire. In particular, a luminaire may comprise one or more light sources. In particular, a luminaire may comprise a light source for generating an indirect light, such as in a diffusely illuminating luminaire, and a light source for generating a direct light, such as in a light emitter. In this case, the control of the amount of light can be carried out directly via the logic unit or via the LMS in which the luminaire is integrated. The functional devices can also be used for data acquisition and/or transmission to the LMS. For example, the functional devices can include $CO_2$ and/or temperature sensors, which detect or monitor the current $CO_2$ concentration or temperature value, and provide the detected data, for example for the purpose of building maintenance or servicing. Furthermore, this information can be used to optimise energy consumption or to increase the efficiency of company processes.

The one or the more communication modules may comprise a module designed for wireless communication. The extension module may in particular comprise a ZigBee, Bluetooth, or DALI interface. ZigBee® is a registered trademark of the ZigBee Alliance. Bluetooth® is a registered trademark of the Bluetooth Special Interest Group. DALI® (Digital Addressable Lighting Interface) is a registered trademark of the International Standards Consortium for Lighting and Building Automation Networks. By using standardised interfaces, functional devices connected to the communication module can be remotely controlled or integrated into an LMS via standard protocols. In particular, the communication module can be designed to act as an interpreter between the logic unit and the LMS by communicating with the LMS via a standard protocol and communicating with the logic unit via the internal or proprietary protocol of the communication bus. An LMS enables customers to control different luminaires individually or in groups and to define lighting scenes ranging from simple to complex. An extension module can also be a communication module and a functional device at the same time, for example a ZigBee module with an integrated PIR sensor (Passive Infrared Sensor).

Due to the connectivity of the logic unit via the communication bus with one or more extension modules, the network assembly around the logic unit as the central unit or "core module" can be modularly and flexibly expanded or extended. Thus, an intelligent luminaire system can be realised by means of the basic module, which allows the customer to determine the functionality, complexity and costs of control gear or luminaires and to adapt them to his own needs. In particular, the base module represents a design platform that allows functional devices to be used freely and flexibly, if necessary in compliance with any norms, standards and requirements in the desired device network or light management system.

The logic unit can be configured to search for an extension module connected to the communication bus via the communication bus. This search function allows the logic unit to determine if an extension module or a further extension module has been connected to the communication module and to react accordingly if necessary. The logic unit may be configured to configure an extension module for the communication bus if the search determines that the extension module is connected to the communication bus. In particular, the logic unit may automatically configure a communication module connected to the communication bus as intended, so that, for example, configuring a communication module automatically initialises the network setup for an LMS.

In some embodiments, the logic unit has a further interface, in particular a plug & play interface, for connecting a plug & play functional unit or a functional device that can be directly controlled by the logic unit via control signals. For example, an LED driver without microcontroller-based intrinsic intelligence can be connected to the plug & play interface and directly controlled by the logic unit. In such a case, the variables of the LED driver set at the factory can be stored directly in the logic unit. Intelligent LED drivers that have their own microcontrollers can be connected to the communication bus or ILB interface.

According to a second aspect, a network assembly is provided. The network assembly comprises a base module, a communication bus for providing communication between a logic unit of the base module and one or more extension modules, wherein the network assembly further comprises an extension module according to the first aspect connectable to the communication bus of the network assembly. The connectable extension module can be used to provide additional functions, in particular control and/or network functions of the electrical load. In particular, the additional functions can enable the electrical load, in particular a luminaire, to be controlled with a device management system or LMS and/or sensors. The extension module can be designed separately or as part of a functional device, for example a luminaire.

The network assembly can in particular comprise a driver for driving an electrical load, wherein the extension module is designed as a driver extension module for connecting to the driver, in particular via the communication module or ILB. Electronic devices, for example luminaires, that require a driver can be easily retrofitted with the extension module that can be connected to the driver.

The modular design of the network assembly makes it possible to easily upgrade or retrofit the network structure with extension modules.

The network assembly may comprise at least one light source, in particular at least one LED light source, and at least one driver, in particular an LED driver, for driving the at least one light source, wherein the at least one driver may be designed as a functional device connectable to the communication bus. In particular, the network assembly may be designed as a luminaire. Such a luminaire can be easily equipped with additional functions by connecting additional extension modules, such as additional functional devices and/or communication modules, to the communication bus.

In some embodiments, the network assembly comprises a plug & play LED driver connected to the plug & play interface of the logic unit and directly controllable by the logic unit. Thus, simple LED drivers that are not able to communicate with the logic unit via the system-internal communication bus can be directly controlled by the plug & play interface.

The at least one extension module can comprise at least one communication module for connecting the network assembly, in particular via a standardised protocol, to a network system or LMS. In particular, the at least one communication module can be designed as a communication module for wireless communication with a network system or LMS.

According to a third aspect, a luminaire is provided. The luminaire, which may in particular be designed as an LED luminaire, comprises a light source, in particular an LED light source or LED light engine, for generating a light and a network assembly with an extension module according to the first aspect, wherein the extension module is designed to provide an additional functionality of the luminaire.

In particular, the extension module may comprise a measuring device for detecting at least one current electrical parameter of the luminaire. In particular, the measuring device may be designed to detect power and/or diagnostic data for the at least one electrical load. The current value of parameters as well as power and diagnostic data can be used, for example, for control and/or diagnostic of luminaires in an LMS. The diagnostic data can be used in particular for remote diagnostic of the luminaire or the LMS.

Further, a method for configuring an extension module of a network assembly is provided, wherein the network assembly comprises a base module with a logic unit and a communication bus, in particular a system-internal communication bus, for providing communication, in particular data communication, between the logic unit and one or more extension modules, in particular one or more functional devices and/or communication modules, for function extension or function provision of the network assembly. The method comprises a search, in particular by the logic unit, for an extension module connected to the communication bus. This search function enables the logic unit to determine whether an extension module or a further extension module have been connected to the communication module, in order to react accordingly if necessary. The method further comprises configuring an extension module for the communication bus if the search reveals that the extension module has been connected to the communication bus. Thus, the logic unit can automatically configure an extension module connected to the communication bus as intended, so that, for example, configuring an extension module can automatically initialise the network setup for an LMS.

The method may comprise querying whether the extension module found during the search is a communication module, wherein the extension module may be determined to represent a functional device present in the network assembly by the communication module in a network if the query results in the extension module found during the search being a communication module. A communication module connected to the communication bus can thus be automatically configured, if necessary, for connecting the network assembly to the network, in particular LMS.

Representing may include notifying the communication module of the type of functional device present. Thus, if necessary, the information about the type of functional device can be automatically passed on to the network, in particular LMS, via the communication module.

The method may further comprise sending network-relevant or necessary factory settings of the functional device to the communication module. In this way, the information about the factory settings of the functional device can be automatically forwarded to the network, in particular LMS, via the communication module.

The network structure described above makes it possible, in cases where the network assembly comprises an extension module designed as a luminaire, to calibrate the luminaires subsequently, in particular after an intended installation. In particular, the calibration data can be recorded on a luminaire of the same type and transmitted to the network assembly via an extension module designed as a communication module, in particular one with online capability. Thus, such luminaires can be subsequently calibrated independently of the installation and manufacturer.

BRIEF DESCRIPTION OF THE DRAWINGS

The invention is now explained in more detail with the aid of the attached figures. The same reference signs are used in the figures for identical or similarly acting parts.

DETAILED DESCRIPTION

Figure 1:
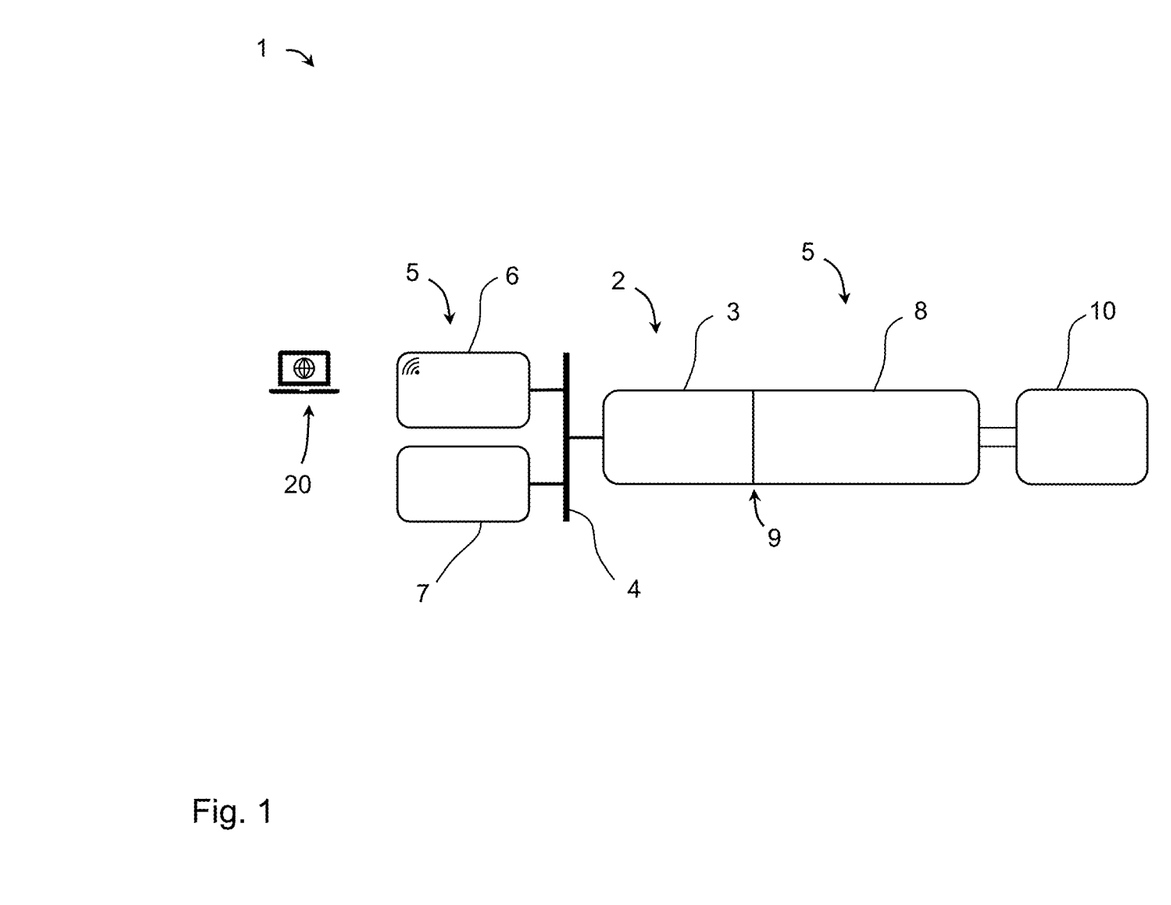
FIG. 1 schematically shows a network assembly according to an embodiment.

FIG. 1 schematically shows a network assembly or interconnect according to an embodiment. The network assembly 1 comprises a base module 2 with a logic unit 3, a communication bus 4 and extension modules 5, which are functionally connected to the logic unit 3. In the embodiment example of FIG. 1, there are three extension modules 5 that are connected to the logic unit 3. An extension module 5 in the form of a Zigbee module 6 and an extension module 5 in the form of a sensor module 7 are connected to the logic unit 3 via the communication bus 4. An extension module 5 in the form of an LED driver 8 is connected to the logic unit 3 via an interface 9. FIG. 1 also shows a light source 10 which is electrically connected to the LED driver 8 and can be controlled by the LED driver 8. The Zigbee module 6 is designed to be connected to an LMS 20 (shown symbolically in FIG. 1).

Figure 2:
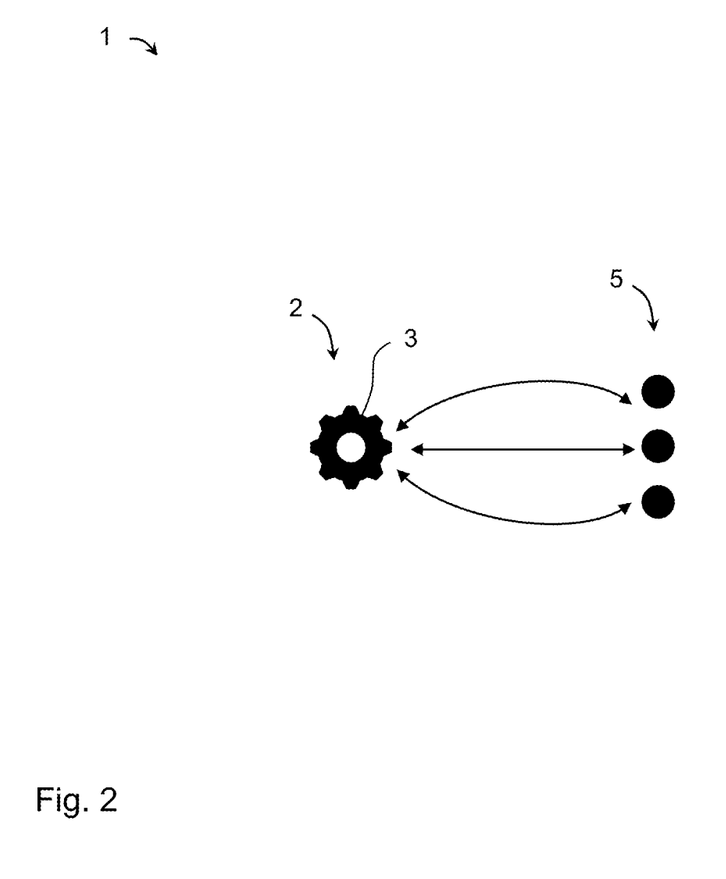
FIG. 2 schematically shows a network assembly according to a further embodiment, FIG. 3 schematically shows a network assembly according to another embodiment, FIG. 4 schematically shows a network assembly according to a further embodiment, FIG. 5 schematically shows a network assembly according to another embodiment.

FIG. 2 schematically shows a network assembly according to a further embodiment. The network assembly 1 or interconnect of FIG. 2 comprises a base module 2 with a logic unit 3 and extension modules 5, which are functionally connected to the logic unit 3. The functional connection between the logic unit 3 and the extension modules 5 is shown schematically by double-sided arrows. The extension modules 5 can be functional devices as well as communication modules. In this embodiment, the network assembly 1 represents a standalone luminaire, wherein one of the extension modules 5 is designed as an LED driver for light control of the luminaire.

The extension modules 5 are connected to the logic unit 3 via a communication bus or ILB (not shown in FIG. 2) similar to FIG. 1. In particular, the logic unit 3 can be configured in such a way that the functional connection or communication via the communication bus between the logic unit 3 and the extension modules 5 can take place via a system-internal or proprietary communication protocol. In some embodiments, all extension modules 5 are connected to the logic unit 3 exclusively via a proprietary ILB. In some embodiments, the logic unit 3 has an additional interface, in particular a plug & play interface, to which in particular an LED driver can be directly connected. The plug & play interface can be designed as a protected proprietary interface so that the use of non-approved or non-qualified LED drivers or other extension modules can be prevented. In particular, the logic unit 3 can be configured in such a way that an LED driver that does not have microcontroller-based intrinsic intelligence can be connected directly to the plug-&-play interface. In such a case, any factory-set variables of the LED driver can be stored directly in the logic unit so that the LED driver can be controlled directly by the logic unit 3. For the LED driver or for further extension modules 5, which have their own intelligence or their own microcontroller, the connection to the logic unit 3 is possible via the communication bus 4 or ILB. The logic unit 3 can be designed to search for extension modules 5 or peripherals via the ILB and to receive, process and send messages to peripherals via the ILB in a standalone mode, in particular without integration of the network assembly 1 in an LMS.

Figure 3:
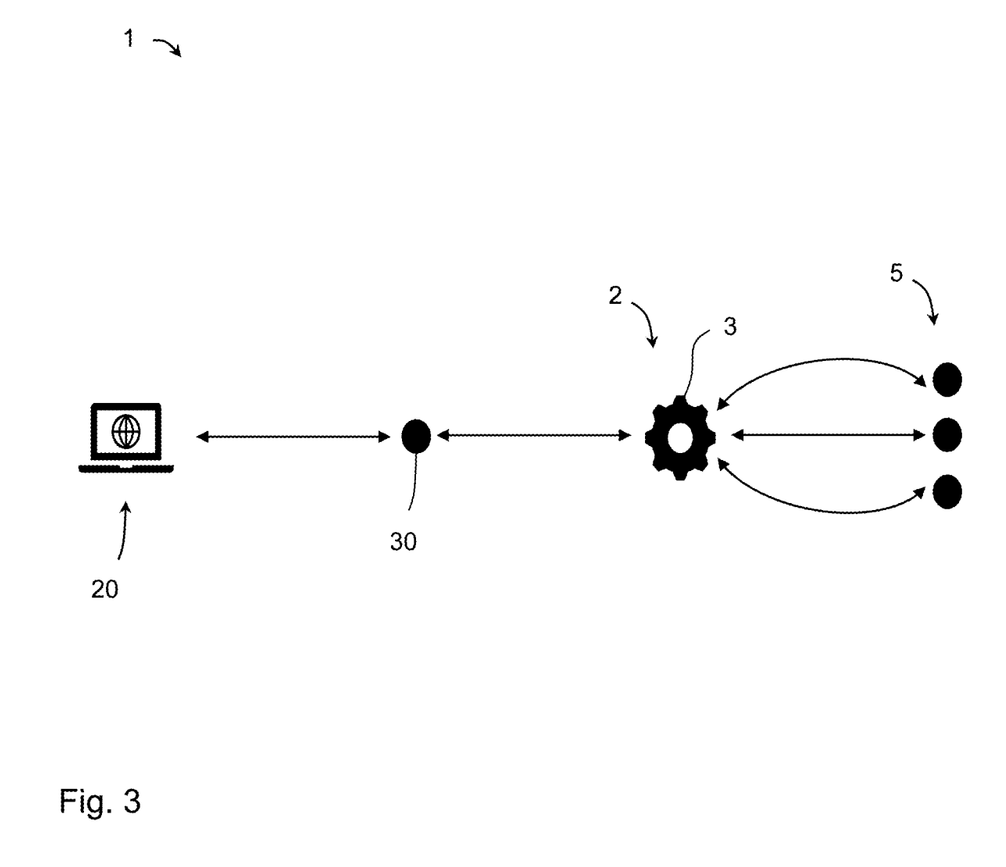

FIG. 3 schematically shows a network assembly according to another embodiment. The network assembly 1 of FIG. 3 corresponds essentially to the network assembly 1 of FIG. 2 and additionally has an extension module in the form of a communication module 30, via which the network assembly 1 can be connected to an LMS 20 (shown symbolically). The further extension modules 5, which are designed as functional devices, are connected to the communication module 30 via the logic unit 3. The connection between the functional devices and the communication module 30 can be flexibly designed via the logic unit 3. In particular, the functional devices can be assigned to the communication module 30 via the logic unit 3 individually, in groups or not at all. After detecting a communication module 30 connected to the communication bus 4, the logic unit 3 can in particular be configured to configure the communication module accordingly and initialise it for participation in a corresponding LMS 20. The flowchart of FIG. 6 below shows the corresponding process flow.

Figure 4:
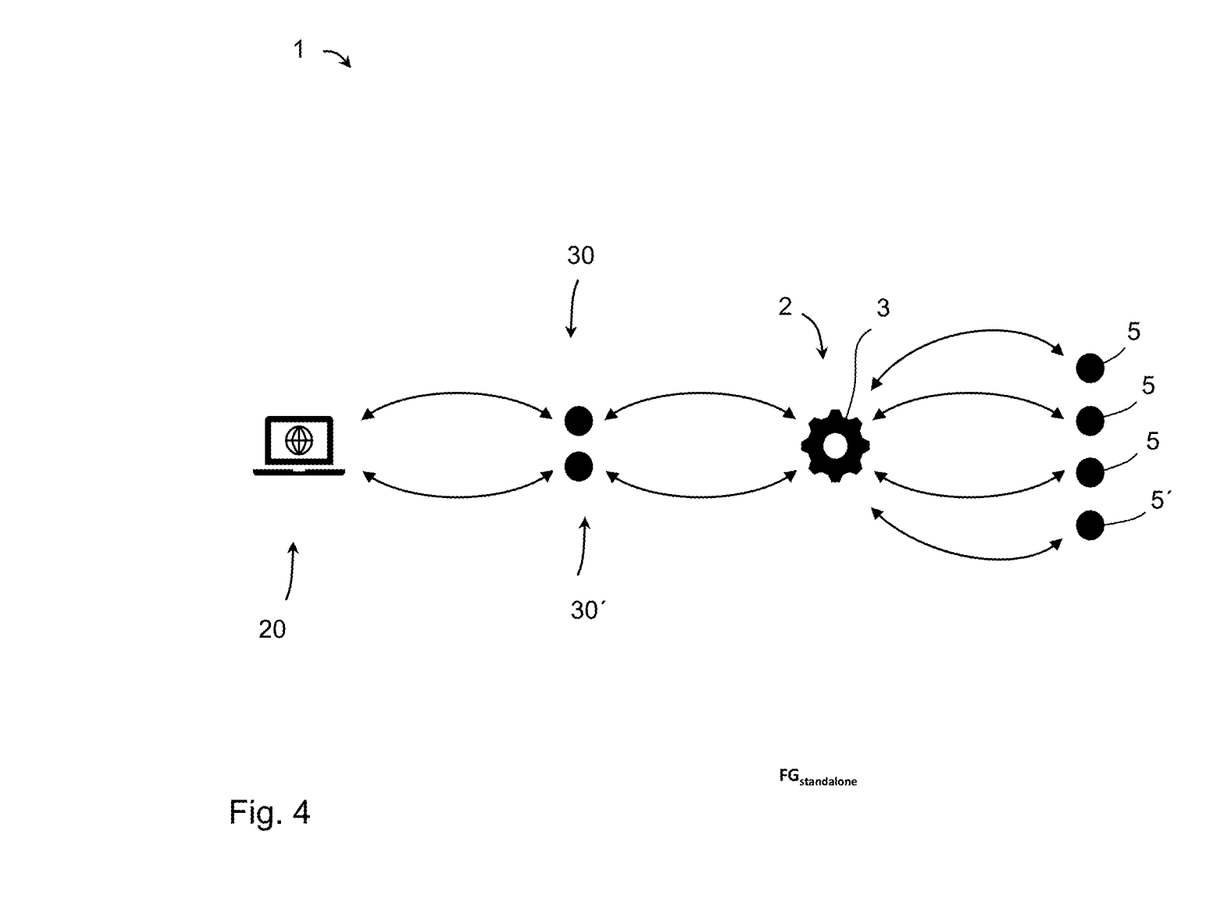

FIG. 4 schematically shows a network assembly according to a further embodiment. The network assembly 1 of FIG. 4 corresponds essentially to the network assembly 1 of FIG. 3 and additionally has a further communication module 30'. Thus, in addition to a first communication module 30, the network assembly 1 of FIG. 4 has a second communication module 30', wherein the network assembly 1 can be connected to an LMS 20 (shown symbolically) via the first communication module 30 and the second communication module 30'. The embodiment shown in FIG. 4 corresponds in particular to the case when the number of functional devices reaches the limit of a communication module for proper operation in an LMS, after which a further communication module of the same type is attached to the logic. The logic unit 3 may in particular be configured to be connected to a plurality of communication modules 30, 30' via the communication bus 4 or ILB so as to ensure proper operation of several functional devices in an LMS. In particular, the logic unit 3 may be configured to assign functional devices to the individual communication modules 30, 30' so that the network assembly 1 can be easily scaled by accommodating additional functional devices. For example, some extension modules 5 or functional devices can be assigned to the first communication module 30 and other extension modules 5' or functional devices can be assigned to the second communication module 30'.

Figure 5:
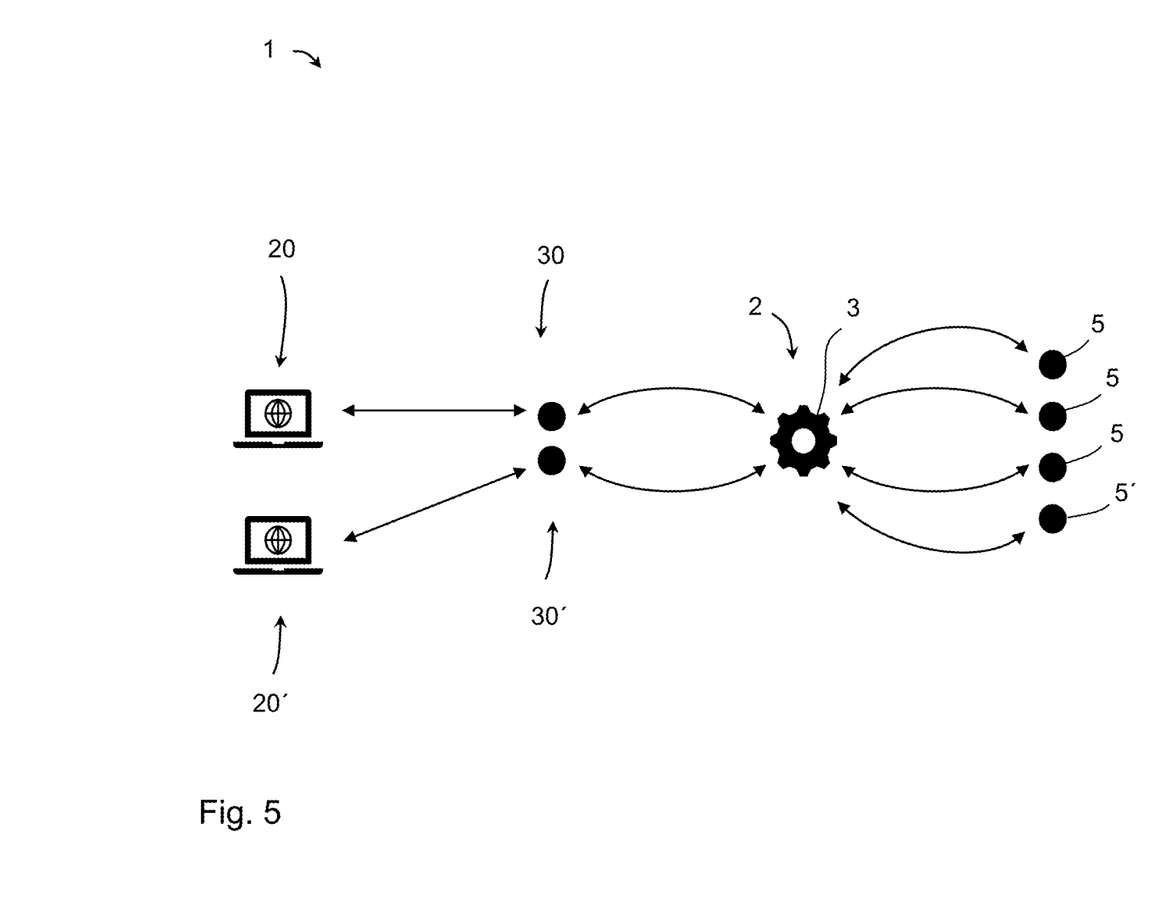

FIG. 5 schematically shows a network assembly according to another embodiment. The network assembly 1 of FIG. 5 corresponds essentially to the network assembly 1 of FIG. 4. Here, FIG. 5 refers to an application when the customer is given the option of displaying the extension modules 5, 5' or functional devices connected to the logic unit 3 alternatively or simultaneously in two LMS 20, 20'. For this purpose, according to the embodiment shown, two different communication modules 30, 30' are used, which can be configured by the logic unit 3. In this case, the logic unit 3 changes to a multi-master mode operation due to the simultaneous existence of two different LMS 20, 20'.

The network assemblies described in FIGS. 1, 3, 4 and 5 above can be designed to subsequently calibrate a luminaire for more precise colour control and optimised maintenance. For example, the measurements can be performed on luminaires with the same luminaire type provided and the calibration data can be made available to the existing installation as an online update. For this option, an extension module or peripheral is installed or if necessary used in the installation, which has an "online update" capability (e.g., ZigBee peripheral). This calibration data may include, in particular, information on the warmest and coldest colour temperature, the nominal luminous flux and the power of the luminaire, and/or a Colour Rendering Index (CRI), as well as information on manufacturers, etc. An implementation example of such a subsequent calibration is shown as a flow chart in FIG. 7.

Figure 6:
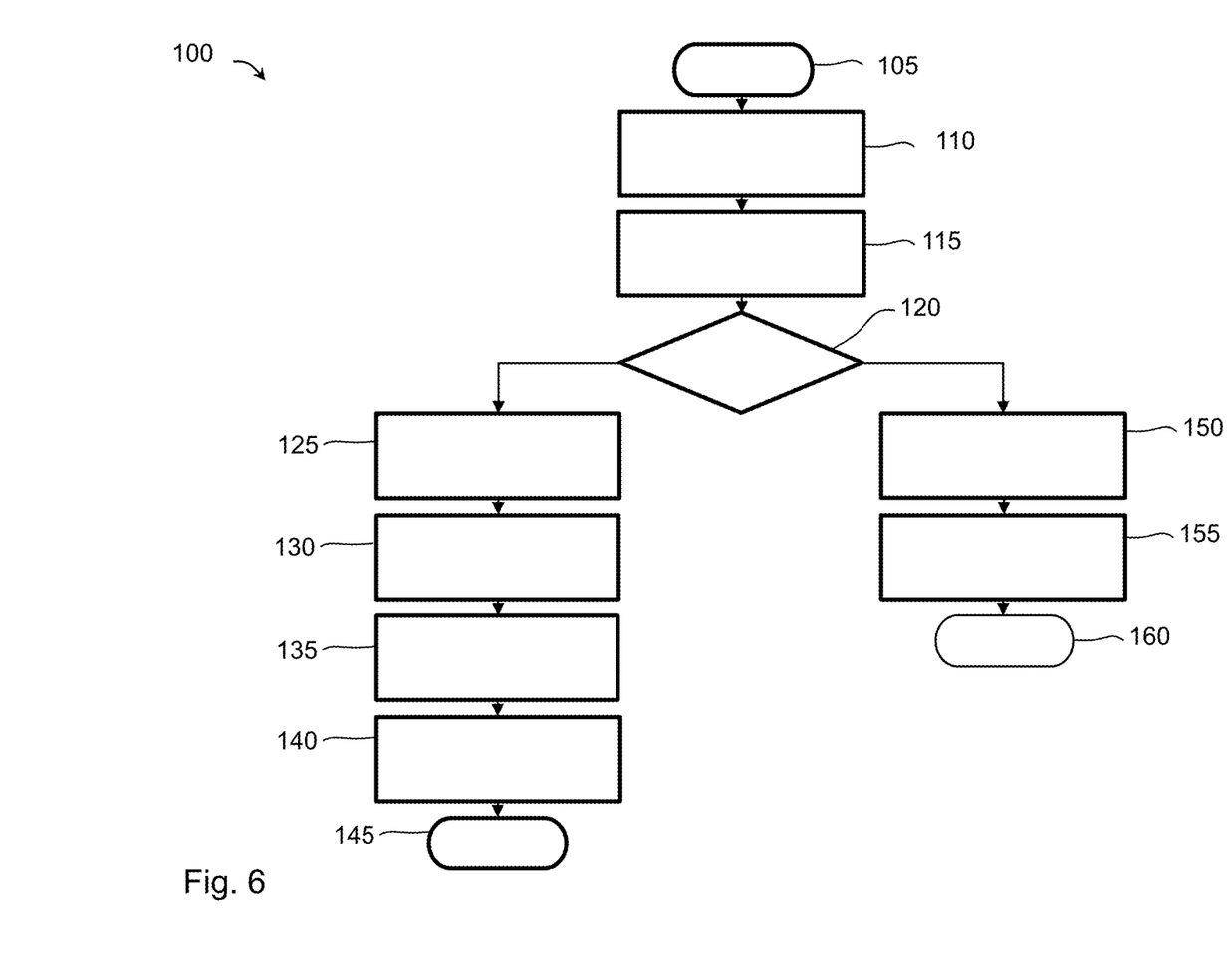
FIG. 6 shows a flowchart of a method for configuring an extension module according to an embodiment.

FIG. 6 shows a flowchart of a method for configuring an extension module according to an embodiment. The method 100 for configuring an extension module or peripheral shown in FIG. 6 can be performed in particular in one of the network assemblies shown in FIGS. 1, 3, 4, and 5. According to the embodiment of the method 100 shown in FIG. 6, after a start 105 of the method 100, in the method step 110 a search is made for a peripheral or an extension module 5 connected to the base module 2, in particular via the communication bus 4 or ILB. In the subsequent step 115, the peripheral or extension module 5 found is configured for the communication bus or ILB. By configuring the extension module in the method step 115, the extension module 5 or peripheral is enabled to participate in the communication via the communication bus 4. In a query step 120, it is queried whether the extension module or peripheral found is a communication module.

If the query in step 120 shows that the extension module 5 found is a communication module, then in method step 125 the communication module can be designated to represent a functional device already present in the network assembly 1 in an LMS. In method step 130, the peripheral or communication module 30 is then notified of the type of functional device to be represented. In the method step 135, the factory settings of the functional device necessary for participation in the LMS are then sent to the communication module 30. In the method step 140, the peripheral or the communication module found is activated for participation in the LMS. The method 100 for configuring the extension module is then ended with the method step 145.

If the query step 120 shows that the extension module is not a communication module, the extension module is recognised as a functional device in the method step 150. In the following method step 155, the functional device is initialised and the method is ended with the method step 145.

Figure 7:
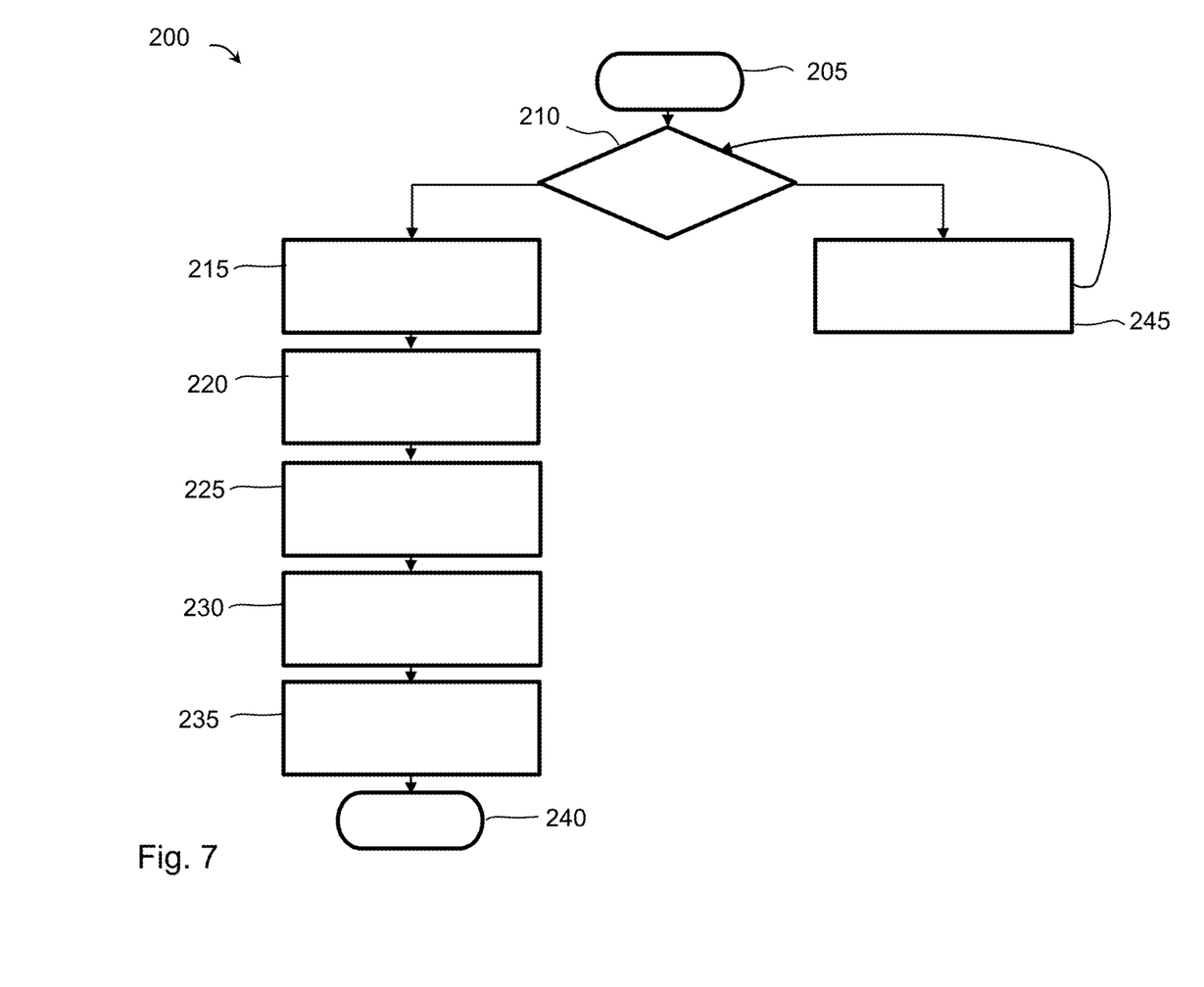
FIG. 7 shows a flow chart of a method for calibrating a luminaire.

FIG. 7 shows a flowchart of a method for calibrating a luminaire. In particular, the method 200 shown in FIG. 7 can be performed to calibrate a luminaire having an internal architecture according to one of the network assemblies shown in FIGS. 1 to 5. According to the embodiment example of the method 200 shown in FIG. 7, after a start 205 of the method 200, a query 210 is performed by the logic unit 3 as to whether a luminaire is present or connected to the ILB. If the query 210 shows that a luminaire is present, a luminaire, in particular of the same luminaire type, is measured for calibration in the method step 215. In the method step 220, calibration data are detected and in the method step 225, the detected calibration data are transmitted to an online-capable peripheral or communication module of the network assembly. In the following step 230, the logic unit 3 is informed of the data received and the control, in particular the colour control of the luminaire, is adjusted accordingly. In the method step 235, the luminaire data are made available to the LMS and the method is ended with the method step 240. If the query in step 120 shows that no luminaire, in particular no luminaire with the required luminaire type, is available, a luminaire is requested to be measured in method step 245.

This calibration option allows customers to minimise the logistical effort associated with commissioning an LMS. This is because usually the luminaires with an LED driver are individually calibrated in the factory. With the luminaires described here, the luminaires can be purchased flexibly, in particular from desired manufacturers, and only calibrated subsequently, in particular according to the calibration method described above.

In addition to the possibility of subsequent factory-independent calibration, the platform design-based network assemblies described above offer a number of advantages. Such network assemblies or systems can, for example, be easily scaled up by connecting further extension modules, in particular functional devices and/or communication modules, to the communication bus or ILB. Furthermore, functional devices can be used flexibly, as required, in different networks or LMS or in a standalone device or luminaire. Furthermore, due to the flexibility of the communication modules, different functional devices can be integrated into an LMS both individually and simultaneously. The modularity of the network assembly simplifies the change from one, for example outdated, LMS to another, in particular future-proof, LMS without having to discard the already existing functional devices. In addition to direct economic advantages, this can be of decisive importance for both luminaire manufacturers and customers, especially with regard to the "circular economy" and ever stricter environmental regulations. The ability to subsequently calibrate the luminaires makes it possible to achieve precise light colour control and high-quality Human Centric Lighting (HCL), for example by imitating daylight particularly realistically.

Figure 8:
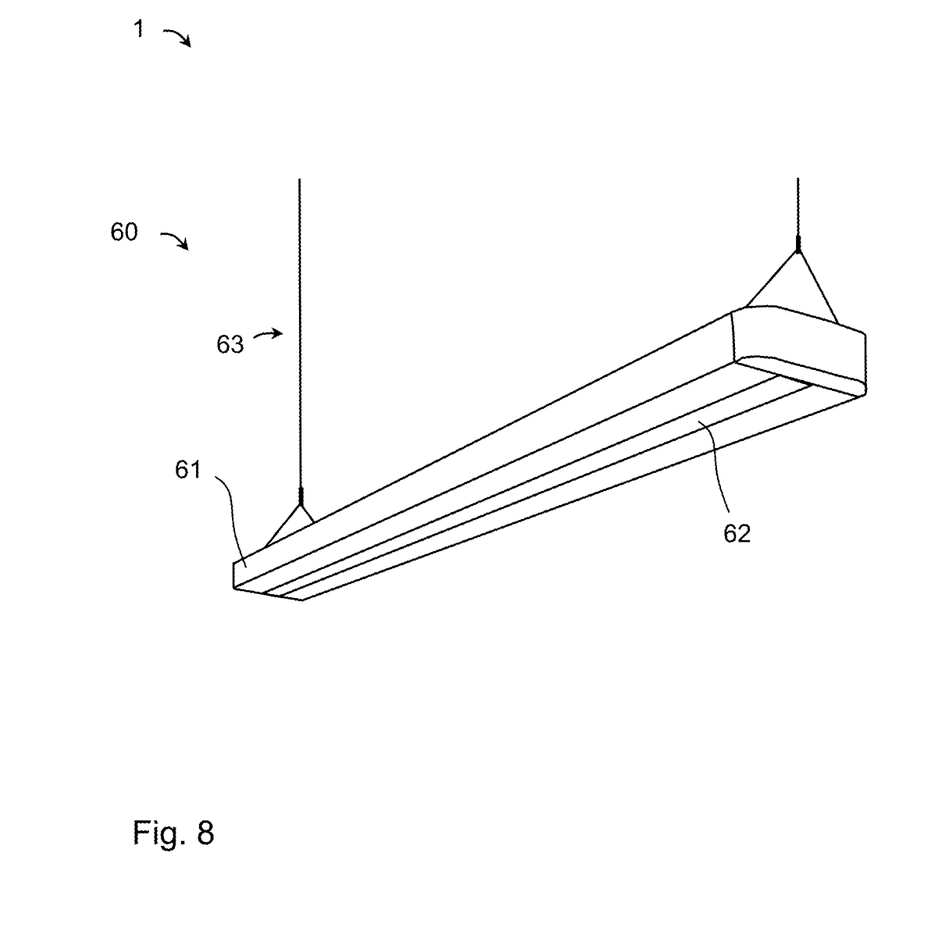
FIG. 8 shows a network assembly designed as a luminaire according to an embodiment.

FIG. 8 shows a network assembly in the form of a luminaire according to an embodiment. In the embodiment of FIG. 8, the luminaire 60 is designed as a so-called LED pendant luminaire. The luminaire 60 comprises an LED light source or LED light engine (not shown) for generating an LED light, a housing 61 with a light emission window 62, and a suspension device 63 for suspending the luminaire 60 from the ceiling. The luminaire 60 further comprises a driver 8 (not shown) for driving the LED light engine or light source, a network assembly 1 (not shown) comprising a communication bus 4 or ILB according to any of the aspects described above. The network assembly 1 is realised in the luminaire 60 by means of a base module 2 (not shown) in the form of an interconnect module connected to the driver 8, as illustrated below in FIG. 9. It is understood that FIG. 8 shows an exemplary design of a luminaire and that the network assembly described here is not limited to a specific electrical load or to a specific luminaire.

Figure 9:
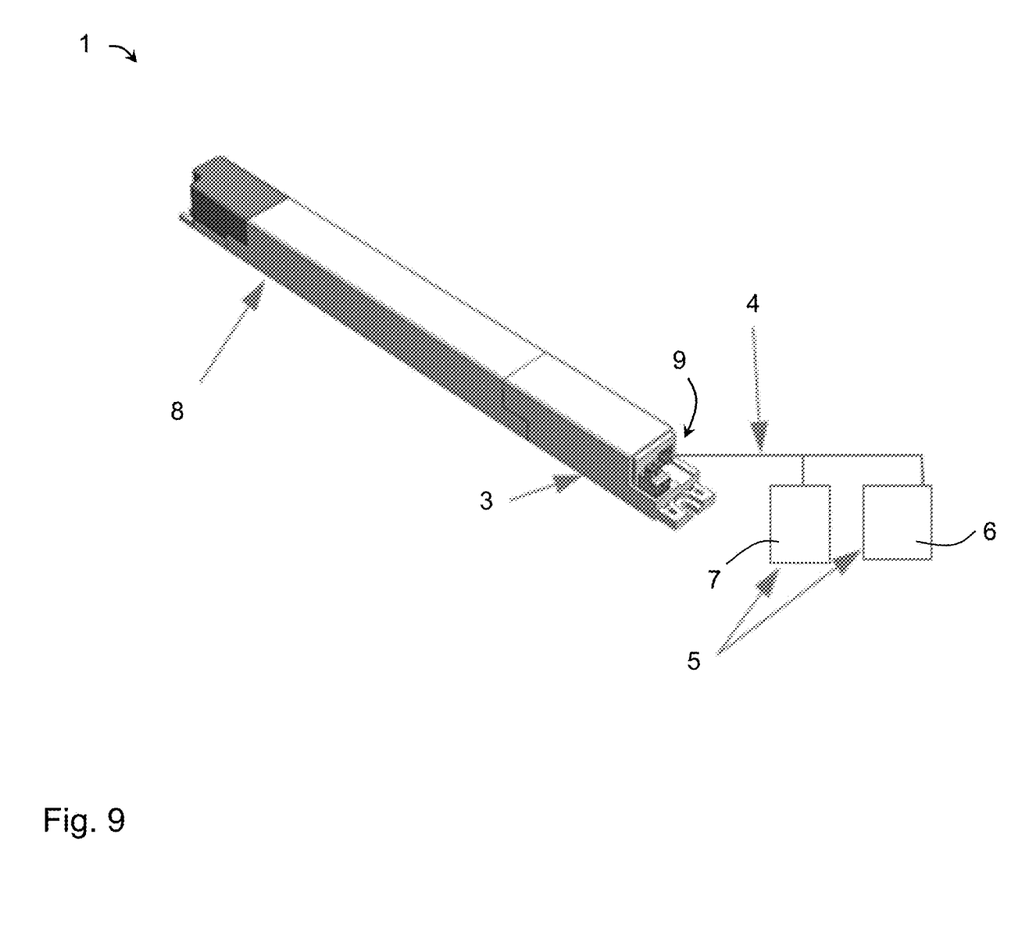
FIG. 9 shows a network assembly with a driver according to a further embodiment.

FIG. 9 shows a network assembly with a driver according to a further embodiment. In the embodiment of FIG. 9, the driver 8 is designed to control a luminaire, for example the luminaire shown in FIG. 8. A base module 2 or interconnect module with a communication bus 4 or ILB is connected to the driver 8. The base module 2 has an interface 9 for connecting extension modules 5 to the base module. In FIG. 9 two extension modules 5 schematically shown as an example, namely a Zigbee module 6 for providing wireless communication via the Zigbee protocol and a sensor module 7 with a motion detector for detecting a motion signal and for controlling the luminaire on the basis of the detected motion signal. However, the communication bus 4 or the interface 9 is designed to be connected to more than two extension modules, in particular to a plurality of extension modules. In particular, due to the expandability of the luminaire 60 by connecting further participants or connectivity peripherals or extension modules to the communication module 4 or ILB, such an "interconnect luminaire" is able to communicate with an LMS or to be controlled by it on the basis of bus-capable sensors or sensor peripherals.

Figure 10:
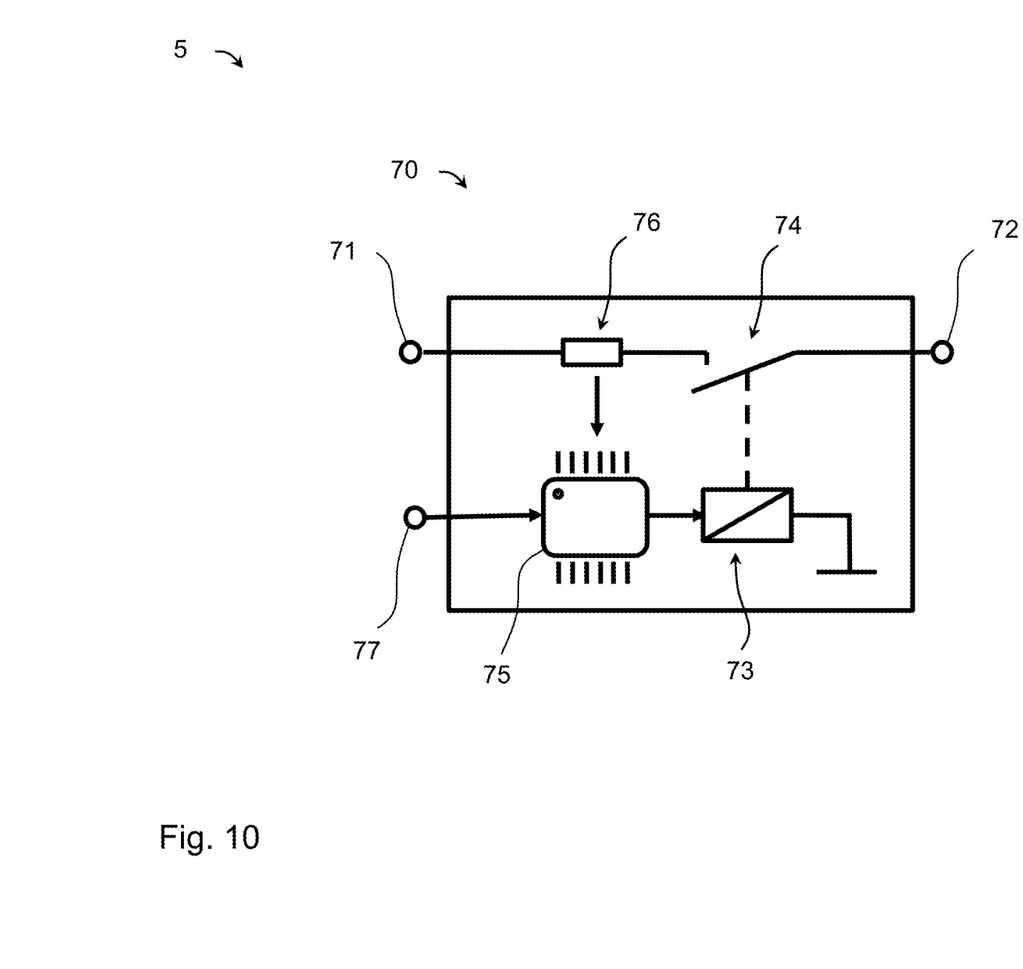
FIG. 10 shows a schematic circuit diagram of an extension module according to an embodiment.

FIG. 10 shows a schematic circuit diagram of an extension module according to an embodiment. In this embodiment, the extension module 5 is in the form of a circuit device 70. In particular, the circuit device may be formed as an extension module 5 or part of an extension module 5 for connection to the communication bus 4 of a network assembly 1. The circuit device 70 comprises an input 71, in particular a power input, having an input terminal, and an output 72, in particular a power output, having an output terminal, wherein the input 71 and the output 72 being connected to one another via a controllable switch contact, in particular a switch 74 or power switch which can be driven by a switch driver 73. The switch 74 may be a relay switch and/or a semiconductor switch. The circuit device 70 has a control unit 75, a measuring device 76 or sensor system and a control input 77 or control interface.

The measuring device 76 is electrically connected to the input 71 and is designed to detect a current input parameter, in particular an output current, an input voltage and/or input power, and to send a measurement signal corresponding to the detected input parameter to the control unit 75. The control unit 75 may be configured to detect the measurement signal generated by the measurement device 76 and to control the switch driver 73 to turn the switch 74 on or off based on the detected measurement signal. The control input 77 is configured to be connected to the communication bus 4 or to the bus system or ILB of the network assembly 1. The measuring device 76 may in particular comprise a power measuring unit, in particular comprising a Hall sensor and/or shunt, and be configured to measure the power consumption of the connected loads, in particular luminaires. The results of this power measurement can be transmitted to an LMS via the communication bus 4. The circuit device 70 can be designed as an external component and/or as a component integrated in a luminaire.

The measuring device 76 can be used in particular to read out power data, and the switch 74 can be used to control the luminaire on the basis of the power data detected, in particular remote control. The circuit device 70 is a so-called master/slave switch box and can be used to switch an external device, in particular a luminaire, on and off on the mains side. In particular, the switching device 70 can act as a central switch for further switches or "slave" switches, so that an LMS with several switches can be implemented in a simple and cost-effective manner.

Figure 11:
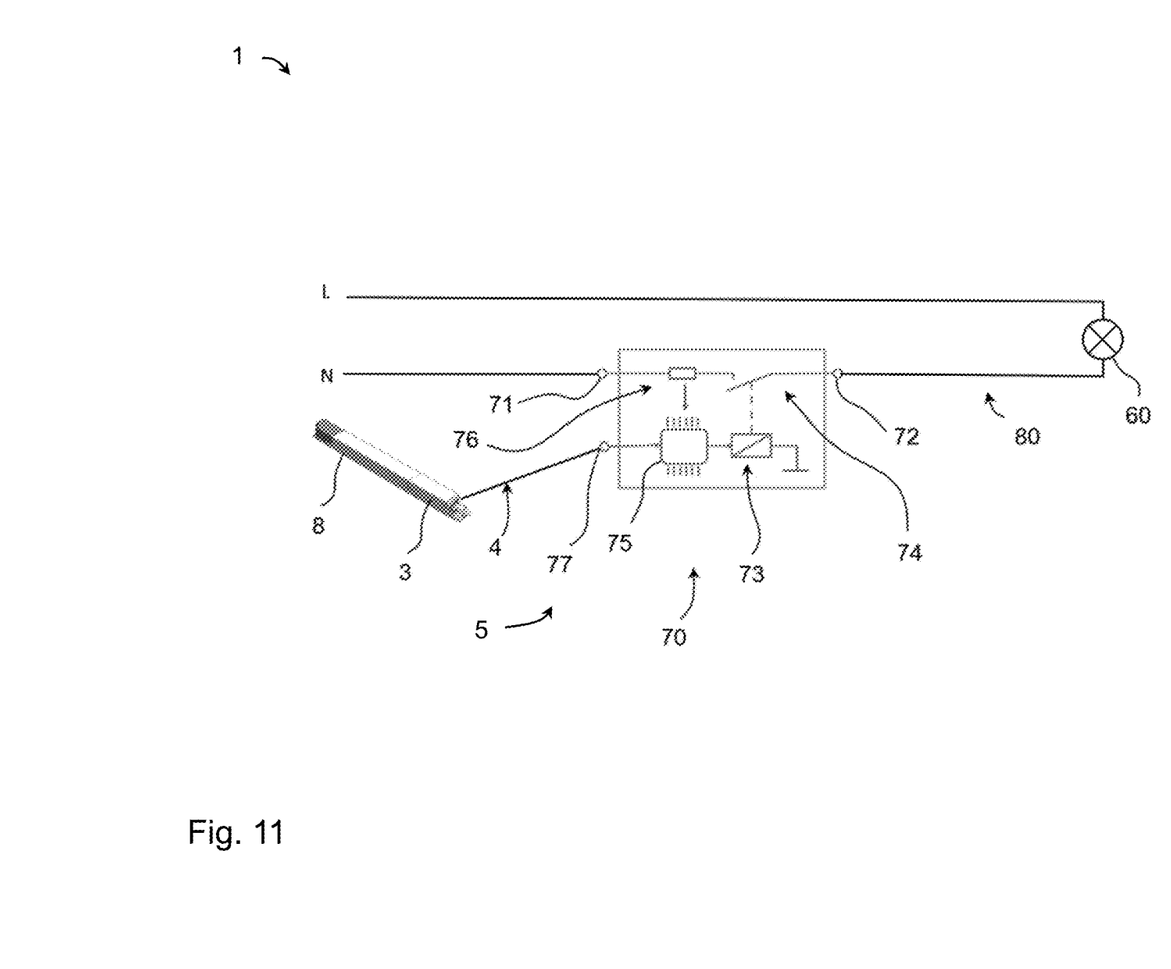
FIG. 11 shows a schematic circuit diagram of an application example of the extension module according to FIG. 10.

FIG. 11 shows a schematic circuit diagram of an application example of the extension module according to FIG. 10. In the application example shown in FIG. 11, the circuit device 70 or the master/slave box is used to control a luminaire 60. FIG. 11 also shows a power supply circuit with power supply lines L and N for supplying power to the luminaire 60. The circuit device 70 according to FIG. 10 is connected to the power supply circuit 80 with the input 71 and with the output 72. The circuit device 70 is connected in series with the luminaire 60 in such a way that the electrical current must flow through the switch 74 of the circuit device 70 in order to supply the luminaire 60 with electrical energy. Thus, the circuit device 70 performs the object of a switch, in particular a conventional switch, which switches the luminaires off and on by interrupting or establishing the power supply. FIG. 11 also shows a driver 8 as well as a base module 2 or interconnect module connected to the driver 8 according to FIG. 9, wherein the interface 9 of the base module 2 is electrically connected to the control input 77 of the circuit device 70 via the communication bus 4 or ILB. Communication with an LMS 20 or the integration of sensors or further extension modules can be carried out via the communication bus 4 shown, which also enables the integration of sensors, ZigBee or DALI components. FIG. 11 illustrates that the circuit device 70 can in principle be used to control any type of electrical loads or luminaire, in particular conventional luminaires. The power section, in particular the switch 74 as well as the input 71 or input terminal and the output 72 or output terminal, of the circuit device 70 can be configured or dimensioned in particular for the specific application so that the circuit device 70 can withstand the maximum currents to be expected. The circuit breaker can be controlled via the bus system or ILB, as described above, so that the switch 74 or switching contacts of the switch 74 can be controlled by an LMS, in particular using connectivity peripherals, or also by sensors, in particular using sensor peripherals.

The power supply for the supply of the bus system or ILB can be provided continuously or uninterruptedly by the "interconnect light." In this way, maximum availability of the system or the functionality of the circuit device 70 is ensured. By using such extension modules, the work and costs involved in changing from conventional lighting solutions, in which in particular several luminaires are switched on and off with a switch directly or on the mains side, to LMS-based lighting solutions can be reduced. In addition, LMS offer various functions for automation and remote maintenance etc. of lighting solutions. The functions of remote lighting control (on/off) and/or power consumption measurement described above can also be realised with the help of an LMS. If, for example, buildings with conventional lighting systems are to be converted to lighting systems based on a lighting management system, this involves costly modifications. In particular, these changes may involve the replacement of individual components (e.g., drivers) and/or—usually—the replacement of complete luminaires.

Even in the case of a new installation of an LMS (e.g., in a new building), additional costs are incurred, as the use of intelligent luminaires or drivers is also required here. Consequently, LMS or luminaires configured for LMS are always associated with higher costs compared to conventional lighting solutions. The principles described here enable conventional lighting installations to be upgraded so that they can be operated by a lighting management system. Furthermore, the principles described here can also be used for new installations as a cheaper alternative to full LMS. In particular, functions such as remote control by LMS or sensors, reporting of energy consumption and rudimentary diagnostic functions can be realised.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be connected with each other in order to obtain further functions.

LIST OF REFERENCE SIGNS 1 network assembly
2 basic module
3 logic unit
4 communication bus 5, 5' extension module
6 Zigbee module
7 sensor module
8 LED driver
9 interface
10 light source
20, 20' LMS
30, 30' communication module
60 luminaire
61 housing
62 light exit window
63 suspension device
70 circuit device
71 input
72 output
73 switch driver
74 switch
75 control unit
76 measuring device
77 control input
80 power supply circuit
100 method for configuring an extension module
105 method step
110 method step
115 method step
120 method step
125 method step
130 method step
135 method step
140 method step
145 method step
150 method step
155 method step
160 method step
200 method for calibrating a luminaire
205 method step
210 method step
215 method step
220 method step
225 method step
230 method step
235 method step
240 method step
245 method step

The invention claimed is:

1. An extension module for function extension of a network assembly, wherein the network assembly has a communication bus for providing communication between a logic unit of a base module of the network assembly and the extension module, and wherein the extension module is configured to be connected to the communication bus of the network assembly in order to provide at least one additional function of an electrical load connected to the network assembly, the extension module comprising:
   a power section configured for integrating the extension module into a power supply circuit of the electrical load; and
   a control section with a control unit configured for controlling the power section.

2. The extension module according to claim 1, wherein the power section comprises a power switch for switching the electrical load on and off.

3. The extension module according to claim 1, wherein the control section comprises a control interface for connecting the extension module to the communication bus of the network assembly.

4. The extension module according to claim 1, wherein the extension module further comprises a measuring device for detecting at least one current electrical parameter of the electrical load.

5. The extension module according to claim 4, wherein the measuring device is configured to detect at least one of power and diagnostic data for the electrical load.

6. The extension module according to claim 4, wherein the measuring device comprises at least one of a Hall sensor and a shunt for detecting the at least one current electrical parameter.

7. The extension module according to claim 1, wherein the at least one additional function comprises controlling the electrical load.

8. The extension module according to claim 1, wherein the extension module is configured to operate as a master module for controlling one or more slave modules.

9. A network assembly comprising:
   the extension module according to claim 1;
   a base module comprising a logic unit; and
   a communication bus for providing communication between the logic unit of the base module and the extension module;
   wherein the extension module is connectable to the communication bus.

10. The network assembly according to claim 9, wherein the network assembly further comprises a driver for driving an electrical load, and wherein the extension module is formed as a driver extension module for connecting to the driver.

11. A luminaire comprising:
   a light source for generating light; and
   a network assembly comprising the extension module according to claim 1, wherein the extension module is configured to provide at least one additional function of the luminaire.

12. The luminaire according to claim 11, wherein the extension module further comprises a measuring device for detecting at least one current electrical parameter of the luminaire.

13. The luminaire according to claim 12, wherein the measuring device is adapted to detect at least one of power and diagnostic data for the luminaire.

14. The luminaire according to claim 13, wherein the extension module is configured to operate as a master module for controlling one or more slave modules.

15. The extension module according to claim 1, wherein:
   the extension module comprises a circuit device; and
   at least a portion of the power section and at least a portion of the control section are native to the circuit device.

16. The extension module according to claim 1, wherein:
   the extension module comprises a circuit device; and
   the control unit is a constituent component of the circuit device.

17. The extension module according to claim 1, wherein the control unit is native to the extension module.

18. The extension module according to claim 17, wherein the extension module further comprises a measuring device for detecting at least one current electrical parameter of the electrical load, wherein the measuring device is native to the extension module and communicatively coupled with the control unit.

19. The extension module according to claim 1, wherein:
   the extension module is in the form of a circuit device comprising the power section and the control section;

the power section comprises a power input terminal, a power output terminal, and a switch operatively coupled with the power input terminal and the power output terminal;

the control section further comprises a switch driver; and the control unit is configured to cause the switch driver to operate the switch in electrically connecting the power input terminal and the power output terminal.

20. The extension module according to claim 1, wherein the extension module comprises a circuit device which is integrated into a luminaire.

* * * * *